INVENTORS.
ROBERT J. STUMPF
WILLIAM J. MATTES
BY Wolfe, Hubbard, Leydig, Voit & Osann
ATTORNEYS.

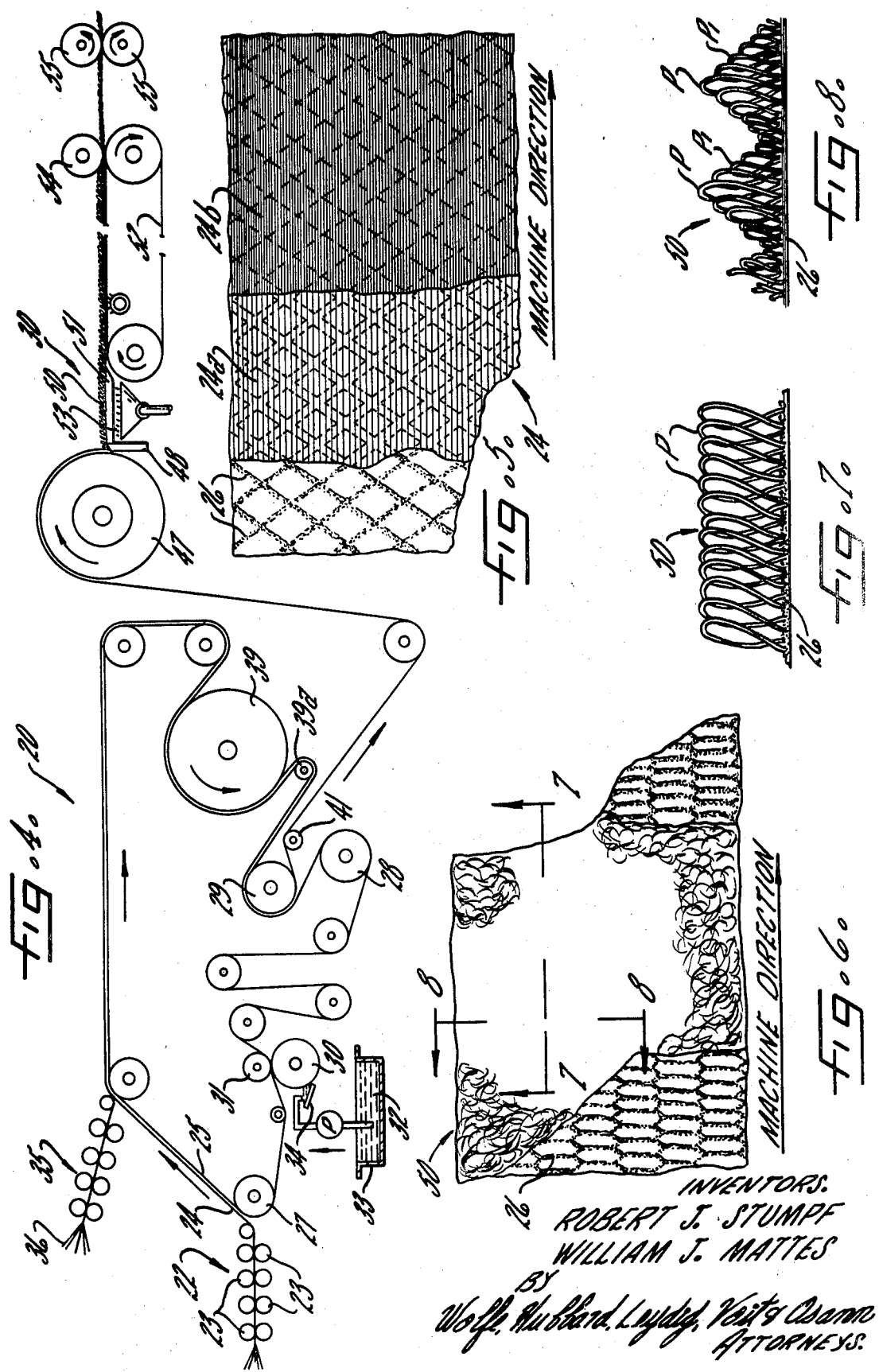

INVENTORS.
ROBERT J. STUMPF
WILLIAM J. MATTES
BY
Wolf, Hubbard, Leydig, Voit & Osann
ATTORNEYS.

United States Patent Office

3,687,796
Patented Aug. 29, 1972

3,687,796
COMPOSITE HIGH-LOFT MATERIAL
FOR BLANKETS
Robert J. Stumpf, Appleton, and William J. Mattes, Neenah, Wis., assignors to Kimberly-Clark Corporation, Neenah, Wis.
Filed Mar. 30, 1970, Ser. No. 23,929
Int. Cl. B32b 5/26, 7/12; D04h 3/04
U.S. Cl. 161—67
7 Claims

ABSTRACT OF THE DISCLOSURE

A laminated material suitable for use in blankets and the like, having two layers of high-loft, nonwoven fabric having a discontinuous backing layer of flexible adhesive, and a multiplicity of fibers individually looped outwardly from the backing layer with the ends of each loop embedded in the backing layer. The two fabric layers are arranged with the two backing layers facing each other, e.g., laminated to opposite sides of a thin sheet of foam material or scrim, or simply laminated directly to each other.

CROSS-REFERENCES TO RELATED APPLICATIONS

Ser. No. 769,959, filed Oct. 23, 1968 now abandoned and replaced by Ser. No. 31,225, filed Apr. 23, 1970 by Robert J. Stumpf. Ser. No. 820,224 filed Apr. 29, 1969, by Robert J. Stumpf.

DESCRIPTION OF THE INVENTION

The present invention relates generally to improved high-loft materials of the type which are suitable for use in blankets and the like.

It is a primary object of the invention to provide an improved high-loft material which has good insulating properties and yet is breatheable so that it can be used in blankets and the like.

It is another object of the invention to provide an improved high-loft material of the type described above which can be economically manufactured and yet provides a combination of relatively high bulk, fire resistance, good feel and draping characteristics along with the other advantageous properties mentioned above.

A further object of the invention is to provide an improved high-loft material of the foregoing type which can be manufactured with a variety of different properties to provide different characteristics and properties in the final product.

Other objects and advantages of the invention will become apparent from the following detailed description taken in connection with the accompanying drawings, in which:

FIG. 4 is a schematic side elevation of one form of apparatus which may be used to produce the high-loft material included in the blanket materials of FIGS. 1 through 3;

FIG. 5 is a fragmentary plan view somewhat simplified and exaggerated for the sake of clarity of illustration, of an illustrative web of base material prepared by the apparatus of FIG. 4 with portions of the material broken away to expose the various layers;

FIG. 6 is a fragmentary plan view of the high-loft material employed in the blanket material of FIGS. 1-3, with portions broken away to expose the various layers;

FIG. 7 is an enlarged, simplified and somewhat exaggerated section taken along section line 7—7 in FIG. 6;

FIG. 8 is an enlarged, simplified and somewhat exaggerated section taken along line 8—8 in FIG. 6;

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention.

Figure 1:
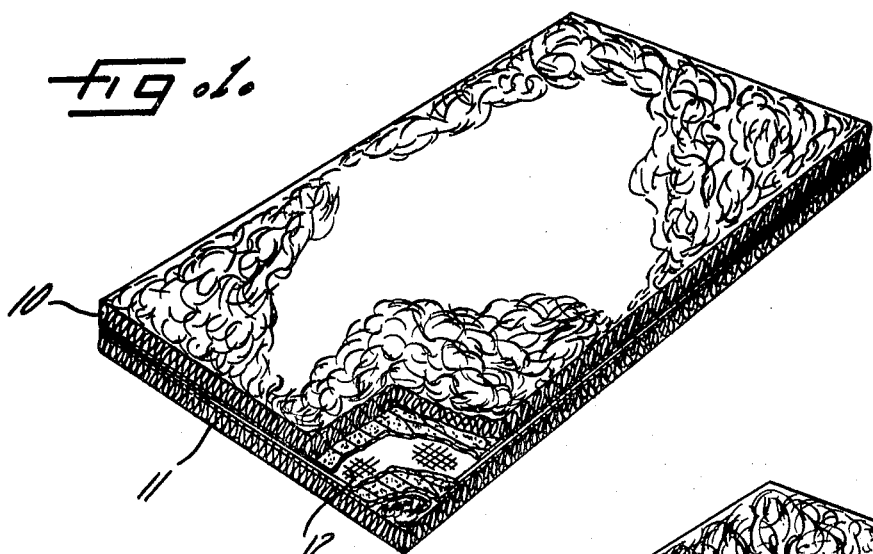
FIG. 1 is a perspective view of a blanket material embodying the invention, with fragments thereof broken away to reveal the internal structure.
Figure 2:
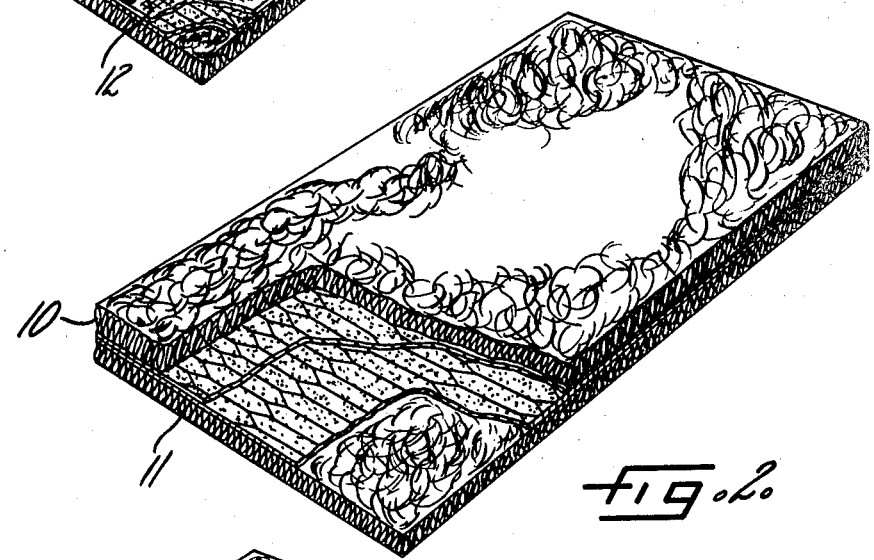
FIG. 2 is a perspective view of a modified blanket material embodying the invention, with fragments thereof broken away to reveal the internal structure.
Figure 3:
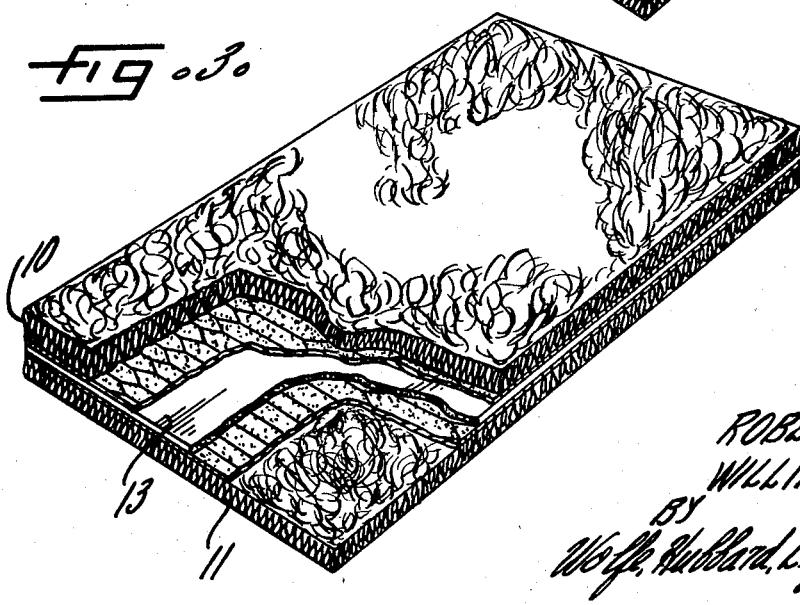
FIG. 3 is a perspective view of another modified blanket material embodying the invention, with fragments broken away to reveal the internal structure.

Turning now to the drawings, and referring first to FIG. 1 through 3, there are shown three different embodiments of laminated materials suitable for use in blankets and the like where it is important to have good heat insulating properties combined with (1) breatheability, (2) good feel and draping characteristics, (3) fire resistance, (4) relatively high bulk, and (5) low cost. In each of the three embodiments illustrated, the outer surfaces of the blanket material are formed by two back-to-back layers 10 and 11 of a high-loft, nonwoven fabric. In FIG. 1, the two layers 10 and 11 are bonded together on opposite sides of central layer of scrim 12, i.e., a nonwoven crossed thread fabric. The central layer of scrim 12 reinforces the composite laminated material in both the longitudinal and transverse directions, and yet is thin and flexible so that the composite material has good draping characteristics. Moreover, because of the relatively large open areas between the crossed threads, the central layer of scrim 12 does not impair the breatheability of the composite material.

In the modified embodiment of FIG. 2, the two layers 10 and 11 of high-loft material are laminated directly to each other. The bonding of the two back-to-back layers of high-loft material may be achieved by activating the thermoplastic adhesive on the backs of the two sheets of material, to be descirbed in more detail below, or by applying an additional adhesive to one or both sheets and then pressing them together.

In FIG. 3, the two layers 10 and 11 of high-loft material are laminated to opposite sides of a central sheet of open-cell foam 13. The foam is thin and flexible so that the composite laminated material has good draping characteristics, and the open-cell structure of the foam provides the composite material with the desired breatheability. The foam also adds to the heat insulating properties of the composite material, as well as increasing the bulk thereof.

In accordance with the present invention, the surface layer of the composite blanket material comprises a high-loft, nonwoven fabric, having a discontinuous backing layer of flexible adhesive on the inner surface thereof, and a multiplicity of fibers individually looped outwardly from said backing layer with the ends of each loop embedded in the backing layer. Thus, in the illustrative embodiments of FIGS. 1–3, the surface material on each side of the composite blanket is a high-loft, nonwoven material preferably prepared by the method and apparatus illustrated in FIG. 4. This apparatus includes a web forming section 20 and an adhesive compacting and fiber looping section 30. The web forming section 20 is generally similar to the apparatus disclosed in copending applications Ser. No. 498,929 and Ser. No. 553,483.

Multiple slivers 21 of heat-settable textile fibers are drawn from their respective supply cans (not shown) into a draw frame 22 which comprises a series of pairs of grooved rolls 23, the rolls of each pair being driven by appropriate gearing well known in the art, at a peripheral rate of speed slightly faster than the rate of operation of the preceding pair. As the juxtaposed slivers pass through the draw frame 22, the individual fibers are drafted and spread out to form a flat striated web of substantially alined fibers as shown at 24. Web 24 is maintained on a supporting conveyor sheet 25 on the surface of which a patterned adhesive has been previously applied.

In the illustrative arrangement the conveyor sheet 25 comprises an endless conveyor belt treated on at least its upper surface with a release agent, e.g., a woven glass fiber with a surface coating of tetrafluoroethylene resin. Other release coatings are well known, and comprise such materials as silicone, fatty acid metal complexes, certain acrylic polymers, and the like. Heat resistant films or thin metal sheets treated with release agents may also be used as the carrier sheet.

Prior to the time the web 24 is picked up by the belt 25, the latter has imprinted on its release-treated surface a pattern of flexible thermoplastic adhesive such as is shown at 26 in FIG. 5. It is understood that the adhesive is actually on the underside of belt 25 which becomes the upper surface after passing around roll 27 whereby the adhesive pattern 26 directly contacts the fiber web 24. The pattern is shown as being visible in FIG. 5 only for illustrative purposes.

The belt 25 is fed around roll 27 at a speed slightly in excess of the delivery speed of the final pair of rolls 23 in order to maintain web 24 under slight tension whereby the individual highly-drafted fibers are retained in their alined and tensioned condition. Drive rolls 28, 29 are rotated to drive belt 25 at a speed sufficient to maintain the proper tension on the web 24.

In the method shown for applying adhesive, the belt 25 is fed through a nip formed between a printing roll 30 and a back-up roll 31 maintained in very light pressure engagement therewith. The surface of printing roll 30 is provided with an intaglio pattern to which adhesive may be supplied in various ways well known to those skilled in the art. For example, in the aforementioned application Ser. No. 769,959 a system is schematically disclosed wherein the lower portion of the printing roll 30 picks up adhesive directly from a dip pan with excess adhesive being removed by a doctor blade, thus leaving only the intaglio patterned surface filled. However, more satisfactory results have been obtained by pumping adhesive 32 from a supply pan 33 to a reservoir located immediately above an inclined doctor blade 34—the reservoir being defined in part by the upper surface of the inclined doctor blade and the adjacent portion of the peripheral surface of the printing roll 30. Thus, as the printing roll 30 rotates (in a counterclockwise direction as viewed in FIG. 1), the intaglio patterned surface thereof is filled with adhesive 32, excess adhesive is removed by the doctor blade 34, and a metered amount of adhesive is then transferred to the underside of release coated belt 25 in a preselected pattern. The pattern shown in FIG. 2 is in the form of an open diamond pattern of adhesive.

Since the surface of belt 25 is treated with a release coating, the adhesive remains substantially on the surface with no penetration therein and is preferably in a somewhat tacky condition. The printed belt is drawn from the printing nip around roll 27 positioned closely adjacent the output end of draw frame 22, and, as stated above, at a speed slightly in excess of the delivery speed of the last two rolls in the draw frame. The web 24 emerging from the draw frame 22 is deposited on the tacky adhesive on belt 25 and held in tensioned engagement therewith by the adhesive and the above-mentioned speed differential. This continuous tension prevents the fibers in the web from losing their highly-drafted and alined condition.

If desired, additional alined and highly-drafted fibers may be added to the web 24 on the adhesively printed belt 25. For this purpose a second draw frame 35 similar to the draw frame 22 is provided to draw additional slivers 36 of fibers from their supply cans (not shown) and, after drafting and alining them, deposit the fibers on the moving web 24 carried by the belt 25. In such cases, the amount of adhesive printed on the belt 25 is increased so that some penetrations of the adhesive pattern reach the fibers from the second draw frame 35, and together with the speed differential of the belt 25 relative to the last pair of rolls in the draw frame 35, maintains these fibers under slight tension whereby they also maintain their highly-drafted and alined condition.

An example of the web 24 formed by the apparatus 20 is shown in FIG. 5. As previously mentioned, a series of parallel and diagonally disposed lines of adhesive are printed in criss-cross fashion on the belt 25 to form pattern 26 of adhesive having substantial open spaces in the configuration of diamonds. It should be appreciated, of course, that FIG. 5 is only intended to be illustrative and, while the lines representing the fibers for both components 24a and 24b are spaced apart for clarity, in practice the highly-drafted fibers of both components are very close to one another. Following deposit of web components 24a and 24b on the adhesive printed belt 25, the belt is drawn around a heated drum 39 where fusing and curing of the adhesive is substantially completed while the web 24 is maintained in firm contact therewith to bond the individual fibers. To insure effective heating and fusing of the adhesive, it is desirable that travel of the combined belt and web be around a substantial portion of the drum 39. In the illustrated embodiment, a fly roll 39a is disposed to provide wrap for the combined belt and web as they travel around the drum 39 to insure complete embedment of the fibers in the adhesive. The fibers of the web 24 are thus bonded together while retaining their highly-drafted and substantially alined condition in the particular pattern in which they were deposited on the open pattern of adhesive 26 printed on the belt 25.

After leaving the fly roll 39a, the combined web 24 and belt 25 are preferably passed over the drive roll 29 which also serves as a cooling drum, to set the adhesive. The bonded web 24 is stripped from the release coated surface of the belt 25 by the guide roll 41 as the web leaves the cooling roll 29.

In general, any of the various known adhesives may be employed. It should, however, be appreciated that the particular adhesive used is dependent upon the characteristics of the flexible heat-settable fibrous web that is being employed, i.e.—the adhesive should be reactivated and softened in the heat setting range of the particular fibrous material being used. In addition, the adhesives should also: be applicable to the base web 24 by procedures which will not disarrange the fibrous structure of the web; be reactivatable in the subsequent adhesive gathering and partial consolidation stage of the process; and form a flexible discontinuous backing layer for the finished fabric and should strongly bond the fiber loops in place.

While various well-known adhesives may be employed in the foregoing process, advantages reside in the use of plastisols, which are colloidal dispersions of synthetic resins in a suitable organic ester plasticizer, and which under the influence of heat provide good binding power while remaining soft and flexible. While many adhesives of this type are known, those found particularly useful for incorporation in the product of this invention include vinyl chloride polymers, and copolymers of vinyl chloride with other vinyl resins, plasticized by organic phthalates, sebacates, or adipates. These provide a fast curing pastisol adhesive characterized by relatively low viscosity, low migration tendencies, and minimum volatility. Such adhesives remain soft and flexible after curing, and can be reactivated by subsequent heating.

It has been found that other adhesive systems may be employed in the process, such as organisols, utilizing resins such as vinyl chloride polymers, and copolymers. Furthermore, other adhesives may be employed provided that they satisfy specified characteristics in the base web produced in the web forming stage, and in the finished fabric produced in the adhesive compacting and fiber looping stage. For example, emulsions of thermoplastic resins such as acrylics and rubber-like compounds illustratively ABS have the requisite properties to serve as the bonding adhesive for the web 24.

The base material made as heretofore described and comprising a web of highly-drafted, heat-settable, fibers embedded in an open adhesive pattern, is then fed into the adhesive consolidating and fiber looping section 30 of the system shown in FIG. 4. The web 24 while still under tension is fed around an idler roll 42 and onto the surface of a heated forming drum 47. The forming drum is maintained at a temperature which will soften the adhesive to a tacky state so that it adheres to the drum surface while also heating the fibers sufficiently to bring them into their heat-setting range. In its preferred embodiment the drum 47 is made of metal with a highly polished chromium plated surface which is internally heated. Also, the web 24 is desirably arranged to travel a substantial distance around the drum 47 (i.e.—have a relatively high degree of wrap) with the open pattern of adhesive 26 in contact with the heated drum surface to provide adequate residence time.

As the web 24 is fed onto the drum 47 the heat from the drum surface heats the fibers to their heat-setting temperature range and reactivates and softens the adhesive printed on the underside of the web, causing it to become tacky and to adhere slightly to the drum surface thereby maintaining the web under constant tension. The drum temperature should be maintained below the melting point of the adhesive to prevent dispersion of the adhesive into the fibers of the web and to minimize bonding of the adhesive lines as will hereinafter be described in greater detail. The web of fibers and softened adhesive is reformed by the cooperative action of the drum 47 and a gathering blade 48 having a flat edge 49. The blade edge 49 operates to consolidate the open adhesive pattern 26 into a backing layer of adhesive while simultaneously looping the fibers of the web outwardly from the open spaces in the original adhesive pattern. The reformed and consolidated material 50 then leaves the blade edge 49 and onto a flat take-off surface 51 and a discharge conveyor 52.

The speed at which the material leaves the gathering blade is closely coordinated with the surface speed of the drum to heat set the fibers in their looped positions while rendering the adhesive non-tacky so the consolidation of the adhesive will only be partial and the bonding of transverse lines of adhesive minimized. To this end and as shown in FIG. 4, this may be accomplished by maintaining the take-off surface 51 at the ambient temperature or slightly higher by directing an air spray 53 at the bottom surface of take-off member 51. While this provides adequate cooling to carry out the objectives of the conditioning step, other means such as a water spray or a refrigerated fluid could be employed to provide a lower temperature if desired. Indeed, as long as the fluid is inert as regards the fibers and adhesives, application may be directly on the partially consolidated and reformed web. The take-away speed should then be set so that, at the temperature of the take-away surface, the fibers will be heat set and yet the bonding of merging lines of adhesive will be minimized. In this connection, it should be noted that the adhesive should be maintained below its melting point to minimize the flowing together of the merging adhesive lines which would provide undesired bonds.

Figure 10:
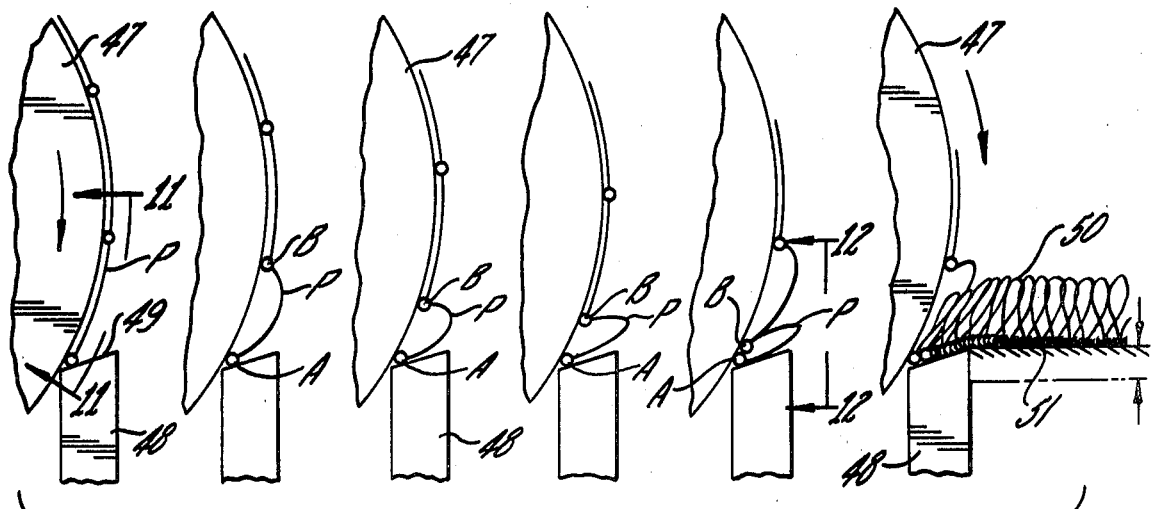
FIG. 10 is a further enlarged schematic side elevation illustrating in somewhat idealized fashion the sequence of gathering and looping of individual fibers.
Figure 11:
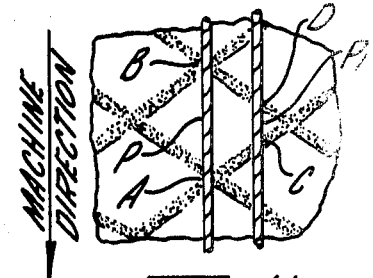
FIG. 11 is an enlarged schematic fragmentary view taken along the lines 11—11 of FIG. 10 showing a fragment of the fiber web and adhesive pattern with illustrative fibers attached to the adhesive.
Figure 12:
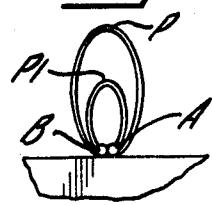
FIG. 12 is a simplified schematic view taken along the lines 12—12 of still another sequence as shown in FIG. 10.
Figure 13:
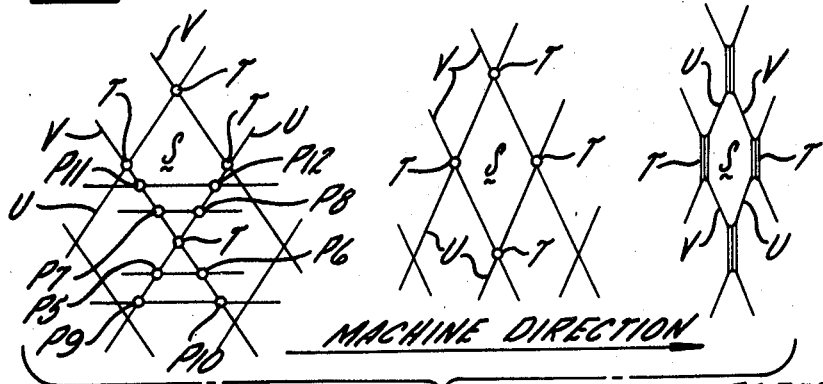
FIG. 13 is an enlarged schematic bottom view showing the sequence of the partial consolidation or closing of the open adhesive pattern to form a discontinuous adhesive backing.

Turning now to FIGS. 10 through 13, the method of making the elastic, high-loft, nonwoven fabric 50 will be explained in greater detail in connection with an illustrative sequence of the gathering and looping of single fibers of the web 24 (FIGS. 10 through 12) and the partial consolidation of the illustrative diamond pattern 26 (FIG. 13). As seen in FIG. 11, the fiber has a portion P which extends across the open space of the diamond pattern of adhesive 26 from point A to B where it is embedded in the adhesive. Referring to FIG. 10, the series of views in this figure illustrates how the portion P of the fiber is formed into a loop; when point A being carried around the heated drum 47 impinges against the gathering blade edge 49, its forward motion is halted and it is scraped along the surface of the drum. Point B continues to advance with the drum surface since due to its softened and tacky condition it adheres to the smooth drum surface.

As point B advances relative to point A, the portion P of the fiber between points A and B is caused to bow outwardly from the drum surface. Finally, point B overtakes point A and these points of adhesive are brought close together without being consolidated as seen in FIG. 12. In the meantime, fiber portion P has been looped outwardly from the drum surface. While this is occurring, of course, additional adhesive points C–D etc., travelling around the drum 47 impinge against the gathering blade edge 49 causing a consolidation of these adhesive points and looping of their intermediate fiber portions $P_1$ as is also indicated in FIG. 12. This occurs simultaneously at all points across the web at the blade edge producing a backing layer of adhesive from which extends the multiplicity of loops formed by the fibers of the base web. The layer of adhesive is carried away from the blade edge along the take-off surface 51 and provides a backing layer for the outwardly looped fibers, thus producing the fabric 50.

Also, not only does each fiber portion P loop outwardly from the drum surface but as the loop is formed it may twist or turn. The degree of loop twisting, and indeed, whether any twisting occurs, is dependent upon such factors as the degree of adhesive consolidation, fiber stiffness, blade angle (as hereinafter defined) and relative uniformity of loop size. In a particular situation, the formed loops may turn through an angle of up to 180°.

FIG. 13 illustrates the partial consolidation that is desired when the open adhesive pattern is the exemplary diamond pattern. Thus, considering a single diamond S, each of the four corners T represents the crossing point of two intersecting lines of adhesive U and V. At every corner T then, as the adhesive is scraped along the surface of the drum, the crossing adhesive lines U and V are brought closer and closer together. The points closest to the corners T merge first because of the shorter distance of separation. Accordingly, point $P_5$ on line U will merge with point $P_6$ on line V before point $P_9$ will meet point $P_{10}$. Similarly, on the other side of the corner, the closer set of points (e.g.—$P_7$ and $P_8$) will merge before points $P_{11}$ and $P_{12}$.

To provide the desired blanket material for use in the present invention, the take-away speed is maintained at a rate such that the adhesive diamonds are not completely consolidated but are collapsed into flat hexagonal shapes in which the crossing points of adhesive have been transformed by partial consolidation of the adhesive into lines that form the sides of the highly elongated hexagons, as shown in FIG. 13. The closed, compact form of the nonwoven fabric may be stretched apart to break the bonds of minimal strength (i.e.—the bonds that will break before adhesive rupture or other degradation of the product). The fabric is then allowed to relax to come to an equilibrium state in its drawn or open position.

The drawing may be accomplished by hand and can be achieved by pulling the fabric apart (i.e.—along the machine direction). As shown in FIG. 4, the fabric exit end of the conveyor 52 may be provided with a roll 54 to form a nip and a pair of rolls 55, also forming a nip. Drawing is accomplished by driving the rollers 55 at a higher speed than that of the conveyor 52.

With respect to the loops, it should be appreciated that the heights of the fiber loops throughout the fabric vary according to the spacing between the points of attachment of each fiber to the open adhesive pattern in the base web. Referring to FIGS. 8, 11, and 12, it will be seen, for example, that the loop formed by the fiber portion $P_1$ between the points of adhesive attachment C, D will have a lower height than the loop formed by the longer portion P between the points A, B. This results in a dense fabric with the lower loops supporting and filling around the higher loops and the top surface of the fabric being formed by the tops of the higher loops.

In accordance with an important aspect of this invention, the base web used to form the high-loft blanket material comprises fine denier, heat settable, fibers. The fine denier of the fibers provides desired softness to the fabric, and the heat settable characteristic improves the loft or bulk stability of the fabric. The denier of the fibers is preferably in the range of from about 1.5 to about 3.0 denier. By heat-settable it is meant that the material will maintain the looped configuration into which it has been formed in accordance with the present invention, regardless of whether the stability of the loop may be attributed to what is technically considered heat setting or whether the setting is the result of some other phenomena. Representative examples of suitable materials include any of the commercially available fibers such as, for example, "Creslon" (American Cyanamid, Stamford, Conn.) and "Orlon" (E. I. du Pont de Nemours and Company, Wilmington, Del.) and olefins such as polypropylene. If desired, a blend of fibers may be used in which only a portion of the fibers are heat settable. This will not, of course, provide the optimum elastic properties. Moreover, not only highly drafted webs and carded webs of staple length fibers may be used for the base but also garneted and air laid webs of such fibers as well as directly laid alined webs of monofilament. It has been noted, however, that when webs such as carded webs are used for the base web in which an important proportion of the fibers are randomly oriented, those fibers not alined with the machine direction appear to interfere with the loop production by the gathering blade and the ultimate stretch characteristics. The most regular formation of loops and optimum elastic and stretch in the formed fabric has been produced with those base webs having the highest proportion of fibers alined with the machine direction, as for example, the highly drafted webs made with the apparatus illustrated in FIG. 4.

Figure 9:
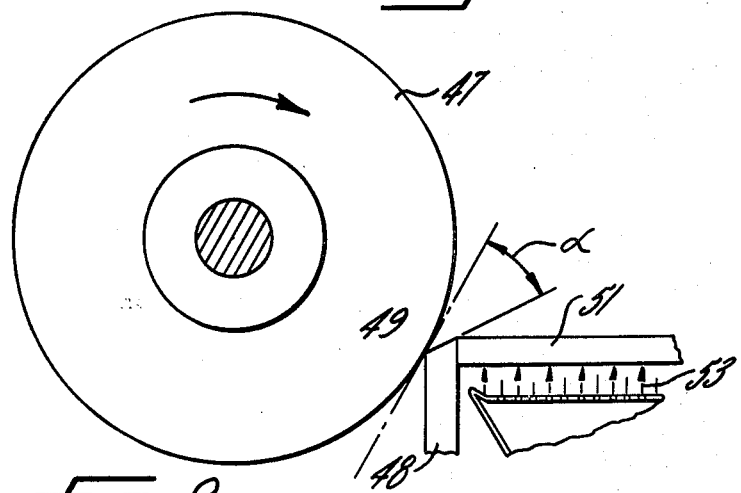
FIG. 9 is an enlarged schematic detail in side elevation of the forming drum and gathering blade of the apparatus shown in FIG. 4.

Elastic, high-loft nonwoven surface material for the composite blanket material described herein can be made in accordance with the present invention by carefully controlling certain process parameters. Initially, the edge angle (FIG. 9) must be kept within certain critical ranges, depending upon the other parameters involved such as, for example, type of adhesive pattern and fiber stiffness. Thus, while angles of from about 20° to about 120° could be employed, the critical range narrows when fiber stiffness, type of adhesive and the adhesive pattern are known. For example, with 2.25 denier polyester, a polyvinyl chloride plastisol and a diamond pattern, a range of from about 20° to 54° should be employed.

The take-away speed of the fabric from the blade edge is also important. With blade 48 having an edge angle $\alpha$ within the preferred range, and assuming the take-away surface is cooled to substantially an ambient temperature, e.g.—75° F. to 80° F., the normal ratio of the surface speed of the heating drum 37 to the take-away speed should be maintained in the range of from about 5:1 to about 10:1, with a ratio of 7 to 8:1 being preferred. By increasing the ratio above 10:1, by slowing down the fabric take-away speed, more adhesive consolidation has been obtained and the mass of the fiber loops is made somewhat more dense, so that a fabric with a higher weight has been produced; but the adhesive lines become more strongly bonded together so subsequent drawing cannot open the adhesive. By increasing the fabric take-away speed, such that the fabric is not allowed to gather at the blade edge, the fabric will be drawn or extended while adhesive layer is still in a plastic condition, thereby opening the adhesive layer, but not allowing sufficient residence time for the fibers to be heat set.

Further parameters that affect adhesive consolidation, fiber looping at the blade edge and the stretchability and elasticity characteristics of the elastic nonwoven fabric are the adhesive pattern applied to the fibers in the formation of the base web, the adhesive weight as a percentage of the weight of the web, and the area of the web covered by the adhesive pattern. The adhesive is preferably applied in the form of diagonal lines, criss-crossed, to provide an open diamond pattern with the size of the opening in the diamond in the machine direction less than the lengths of the fibers used for the base webs. The transverse adhesive lines, when consolidated by the action of the gathering blade, are moved into proximity or abutment with each other but are only minimally bonded together. Thus, when the closed form of the elastic nonwoven is opened, the original pattern will reappear but will be foreshortened (i.e.—the machine direction distance of the pattern will be less).

In the application of the adhesive to the base web, it has been observed that by increasing the adhesive viscosity a sharp, distinct printed pattern will be obtained such that the fibers are securely attached to the adhesive at distinct spaced points and are not embedded in adhesive throughout their length. It is desired to have spaced points of fiber adhesive attachment so that the fiber loops will be distinctly and separately formed at the gathering blade so as to extend outwardly from the bonding adhesive layer. Fiber sizes over the entire prepared range of 1.5 to 3.0 denier have been successfully utilized in the base web with a ¼" diamond pattern of adhesive.

As shown in FIG. 4, the fabric is carried along the take-away surface 51 by the action of the conveyor 62. Since the adhesive backing is hot and tacky as the fabric flows onto the take-away surface 51 which is maintained substantially at ambient temperatures, that surface may be treated with a non-stick or release coating to insure that the fabric may be drawn smoothly along the surface.

To cool the belt of the conveyor 52 and prevent it from becoming overheated from the hot adhesive back of the fabric 50, streams of air may be blown against the underside of the belt from suitably placed air nozzles 60. This will also serve to cool the fabric 50, although it may be necessary or desirable to pass the fabric through a cooling station or zone to cool the adhesive and thermoplastic fibers clearly below their softening temperatures or to eliminate tackiness of the adhesive.

The present invention may be more completely understood from the following examples, which are illustrative of the invention but are not intended as limiting the scope of the invention. The method and apparatus of FIG. 4 was employed for forming the products described in the ensuing examples. The adhesive was a plastisol formulation including, by weight: "Geon 135" polyvinyl chloride resin (manufactured by B. F. Goodrich, Akron, Ohio), about 60 parts per 100 parts resin of "GP-261" dioctyl phthalate plasticizer (B. F. Goodrich), about 2.5 parts per 100 parts resin of "Cab-O-Sil" pyrogenic silica (Cabot Corporation, Boston, Mass.) and a sufficient amount of mineral spirits to bring the viscosity into the desired range (generally from about 3 to 5 percent by weight, based on the total weight of the other components for a viscosity range of 3500–4000 cps.). The viscosities were measured with a Brookfield viscometer using a #4 spindle and operating at 20 r.p.m. The polyester used in the examples was "Fortrel" Type 400 staple fibers, commercially available from Celanese Fibers Marketing Company, Charlotte, N.C. The approximate tenacity of these fibers is 4.8 g.p.d. with elongation at break falling in the 45–55% range. Other physical properties include: loop tenacity (g.p.d.)—4.4, initial modulus (g.p.d.)—40–45, yield stress (g.p.d.)—1.0, yield strain—3.7%, specific gravity—1.38 and melting point—500° F.

Example I

The base web was made from polyester fiber having a denier of about 2.25 and an average fiber length of 2½". The polyvinyl chloride plastisol, having a viscosity of from 3700 to 4000 centipoises, was applied in diagonal lines ¼" apart in both directions to form a diamond pattern. Rotogravure printing was employed and the intaglio roll had adhesive cells or lines 0.006 inch deep and 0.028 inch wide. The weight of the base web was about 12.8 grams/sq. yd., with equal weights of fiber and adhesive being included.

The preheat drum 39 in the first stage of forming the web was maintained at about 300° F. and operated at a surface speed of 65 ft./min. The base web 24 was thus carried to the forming drum 37 at a surface speed of 65 ft./min.

The gathering blade 48 was positioned at an angle $\alpha$ of 54° and maintained against the drum with a pressure of 27 p.s.i. The drum (9 inches in diameter) was internally heated and maintained at a temperature of about 260° F.

The take-away speed was 8 ft./min. to provide a take-away ratio (i.e.—surface speed around drum/take-away speed) of 8.125.

The resulting drawn high-loft material was then bonded to both sides of a sheet of 40-mil foam, with the adhesive backing of the high-loft material facing the foam on both sides thereof. The foam employed was 40 mil-thick polyurethane foam having a density of 2 lbs./cubic foot (Reeves Bros., Cornelius, N.C., "Grade 5080"). Bonding of the high-loft material to the foam was achieved by first printing both sides of the foam with 9 grams/sq. yd. of the aforementioned plastisol adhesive, and then laminating the adhesive-printed foam to the high-loft material by passing the different materials through a hot calandar at a temperature of 320° F. and a nip pressure of 20 p.l.i. (pounds per lineal inch). The resulting composite laminate was subjected to various tests to be described in more detail below, and will be referred to hereinafter as material A.

Example II

Example I was repeated using a high-loft material made of 50% 2¼ d.p.f. 3" staple polyester and 50% plastisol adhesive. Prior to gathering, the fiber-adhesive web weighed about 13 gm./yd.² This web was gathered in a ratio of 1.7 to 1 on a 98° blade angle. The preheat temperature was 270° F. Otherwise, the process, including the laminating steps, were as described in Example I. The resulting composite material was subjected to various tests to be described in more detail below, and will be referred to hereinafter as material B.

Example III

A high-loft material was made as described in Example I but using 2¼ d.p.f. 3" staple polyester and a modified plastisol adhesive made by adding 10% by weight Silastic RTV 3110 (a silicon rubber casting compound made by Dow Corning) to the polyvinyl chloride plastisol adhesive described above. The fiber-adhesive ratio was 45/55, and prior to gathering the fiber-adhesive web weighed about 14.5 grams/yd.² This web was gathered in a ratio of 3.1 to 1, and the resultant high-loft material weighed 45 gm./yd.² The preheat temperature was 320° F., the gathering roll temperature was 290° F., and the gathering blade angle was 98°. The resulting composite material was subjected to various tests to be described in more detail below, and will be referred to hereinafter as material C.

The tests conducted on the materials described in the foregoing examples were as follows:

Tensile strength: Run on an Instron Tester on 1 inch wide strip, loaded at 12 in./min. (4 inch jaw opening).

Bulk: 10 plies of 4 x 4 inch squares under a load of 3.6 lbs./ft.² were measured with a caliper.

Fire resistance: AATCC–33 and NFPA 702 (textile industry standard tests).

Lint: Bausch & Lomb 40-1 particle counter counted the lint in 0.01 cubic feet of air which had passed through a sample which had been crushed 10 times by hand.

Feel: A subjective test (1.0 best; 10.0 worst) comparing the harshness, stiffness, rattle and wrinkling of the samples.

Drape stiffness: Textile Test Method-Fed. Stds. No. 5206–1 (Dec. 31, 1968).

Abrasion resistance: Run on a Stoll abrasion tester with an Appleton Wire Works 54 x 34 mesh chrome screen loaded with 1 lb. for 0–1000 cycles, 2 lbs. for 1001–1500 cycles, 4 lbs. for 1501–2000 cycles and 6 lbs. for 2001–2500 cycles.

Thermal factors: Measured by positioning a sample between two insulating chambers having a temperature driving force therebetween and computing the rate of heat passage through the sample.

Grab tensile: 4" x 6" sample gripped in 1" x 1" jaws separated 3" apart. Load applied at 12"/min.

Flex stiffness: Textile Test Method—Fed. Stds. No. 5206–1 (Dec. 31, 1968).

The results of the foregoing tests were as follows:

| Physical tests | A | B | C |
|---|---|---|---|
| Basis weight (gms./sq. yd.) | 104.81 | 92.34 | 133.25 |
| Tensile strength (lbs./inch): | | | |
| MD dry | 10.3 | 17.3 | 7.9 |
| CD dry | 1.0 | 0.9 | 1.1 |
| Grab tensile (lbs.): | | | |
| Dry MD | 18.7 | 26.7 | 12.5 |
| Dry CD | 3.3 | 3.1 | 3.4 |
| Bulk (ins./10-4" x 4") | 0.724 | 0.484 | 0.813 |
| Fire resistance AATCC-33 (seconds): | | | |
| MD raised | 10.4 | 9.0 | ¹DNI |
| MD flat | 9.0 | 8.4 | 11.8 |
| CD raised | DNI | 9.6 | 9.6 |
| CD flat | 13.0 | ¹IBE | DNI |
| NFPA 702 (max. 21-second flame impingement: | | | |
| MD | | | 15.2 |
| CD | 12.4 | 11.0 | 9.8 |
| Lint (0.3 microns and greater in .01 cu. ft.) | 187 | 140 | 90 |
| Feel tests (subjective); 1=best, 10=worst: | | | |
| Harshness | 3 | 9 | 10 |
| Stiffness | 2 | 5 | 8 |
| Rattle | 1 | 7 | 10 |
| Wrinkle | | | |
| Composite ave. | 2.0 | 7.0 | 9.3 |
| Drape stiffness, inches: | | | |
| MD | 1.40 | 1.63 | 1.32 |
| Composite ave. | 1.32 | 1.39 | 1.30 |
| Flex stiffness, inch-pounds (all are ×10⁻⁴): | | | |
| MD | 4.87 | 6.53 | 4.97 |
| CD | 3.24 | 2.23 | 4.54 |
| Composite ave. | 4.06 | 4.38 | 4.76 |

| Physical tests | A | B | C |
|---|---|---|---|
| Stoll abrasion: | | | |
| Surface change | 8 / 8 | 10 / 57 | 19 / 19 |
| Pills 1.0 sq. mm | 101 / 42 | 577 / 149 | 1,141 / 1,285 |
| Loose fibers | 1,872 / 1,741 | ¹NS / NS | NS / NS |
| Threads or foam exposed | 2,477 / 1,935 | 1,000 / 1,782 | 2,500 / 2,190 |
| Rupture through material | 2,719 / 2,019 | 1,910 / 2,107 | 3,831 / 3,758 |
| Thermal properties: | | | |
| Conductance | 4.54 | 8.66 | 7.00 |
| Factor | .408 | .773 | .469 |
| Thickness | .082 | .095 | .067 |

¹ Code:
DNI=Did not ignite.
SFBB=Surface flash base burn.
NS=Not enough loops to be significant.

We claim as our invention:

1. A composite material comprising two layers of the same nonwoven high-loft fabric laminated together back to back, each said layer of fabric consisting of
   a discontinuous adhesive backing which has been formed by partially longitudinally consolidating an open pattern of spaced apart adhesive bands extending in the cross direction of the fabric, and
   a multiplicity of fibers each embedded at colinear generally longitudinally aligned spaced points in next adjacent bands of adhesive in said backing with the fiber portions between said spaced points individually looped outwardly from said backing, said looped fibers extending over the spaces between said adhesive bands and lying substantially parallel to each other.

2. A composite material as set forth in claim 1 wherein the adhesive backings of said two layers of fabric are laminated to each other.

3. A composite material as set forth in claim 2 wherein said adhesive backings are made of thermoplastic material and are heat sealed to each other.

4. A composite material as set forth in claim 1 wherein the adhesive backings of said two layers of fabric are laminated to opposite surfaces of a thin sheet of flexible plastic foam material having an open-cell structure.

5. A composite material as set forth in claim 1 wherein the adhesive backings of said two layers of fabric are laminated to opposite surfaces of a central layer of scrim material.

6. A composite material as set forth in claim 1 wherein the fibers in said two layers of fabric are heat set in the looped configuration.

7. A composite material as set forth in claim 1 wherein the denier of said fibers is in the range of from about 1.5 to about 3.0.

References Cited

UNITED STATES PATENTS

| | | | |
|---|---|---|---|
| 3,067,430 | 12/1962 | Wilcox | 161—63 |
| 3,075,867 | 1/1963 | Cochran | 161—66 |
| 3,245,854 | 4/1966 | Etchison et al. | 161—67 |
| 3,322,606 | 5/1967 | Koller | 161—67 |
| 3,513,046 | 5/1970 | Westfield | 161—66 |
| 3,533,893 | 10/1970 | Hortstein | 161—65 |
| 3,537,946 | 11/1970 | Truax et al. | 161—67 |

WILLIAM J. VAN BALEN, Primary Examiner

U.S. Cl. X.R.

156—72; 161—148, 156